US012727059B2

(12) United States Patent
Calvo Mestre et al.

(10) Patent No.: US 12,727,059 B2
(45) Date of Patent: Sep. 1, 2026

(54) INDUCTION COOKING DEVICE

(71) Applicant: BSH Hausgeräte GmbH, Munich (DE)

(72) Inventors: Carlos Calvo Mestre, Saragossa (ES); Jorge Español Leza, Saragossa (ES); Guillermo Lazaro Amatriain, Igries (ES); Guillermo Martinez Martinez, Saragossa (ES); Antonio Muñoz Fumanal, Utebo (ES); Jorge Tesa Betes, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 865 days.

(21) Appl. No.: 18/019,252

(22) PCT Filed: Sep. 9, 2021

(86) PCT No.: PCT/EP2021/074762

§ 371 (c)(1),
(2) Date: Feb. 2, 2023

(87) PCT Pub. No.: WO2022/058229

PCT Pub. Date: Mar. 24, 2022

(65) Prior Publication Data

US 2023/0292410 A1 Sep. 14, 2023

(30) Foreign Application Priority Data

Sep. 18, 2020 (EP) .................................... 20382827

(51) Int. Cl.
*H05B 6/12* (2006.01)

(52) U.S. Cl.
CPC ..................................... *H05B 6/12* (2013.01)

(58) Field of Classification Search
CPC ........ H05B 6/062; H05B 6/1218; H05B 6/36; H05B 2213/03; H05B 6/1236; H02M 5/4585
USPC ................................ 219/506, 620, 665, 622
See application file for complete search history.

(56) References Cited

U.S. PATENT DOCUMENTS

2018/0176997 A1* 6/2018 Nam ...................... H05B 6/062

FOREIGN PATENT DOCUMENTS

| | | | |
|---|---|---|---|
| EP | 2506671 | A2 | 10/2012 |
| JP | 2011028880 | A | 2/2011 |

OTHER PUBLICATIONS

International Search Report PCT/EP2021/074762 dated Dec. 7, 2021.

* cited by examiner

*Primary Examiner* — Phuong T Nguyen
(74) *Attorney, Agent, or Firm* — Michael E. Tschupp; Andre Pallapies; Brandon G. Braun

(57) ABSTRACT

An induction cooking appliance apparatus includes a power unit designed to supply an induction heating unit with power in one operating state, a power supply unit designed to supply energy to a further unit in the operating state, a main filter unit designed to filter the power unit, and a secondary filter unit designed to filter the power supply unit. The main filter unit and the secondary filter unit are designed at least in part as a single piece and share a common filter unit for filtering the power supply unit in an inactive mode of the power unit.

16 Claims, 4 Drawing Sheets

INDUCTION COOKING DEVICE

CROSS-REFERENCES TO RELATED APPLICATIONS

This application is the U.S. National Stage of International Application No. PCT/EP2021/074762, filed Sep. 9, 2021, which designated the United States and has been published as International Publication No. WO 2022/058229 A1 and which claims the priority of European Patent Application, Serial No. 20382827.2, filed Sep. 18, 2020, pursuant to 35 U.S.C. 119 (a)-(d).

The contents of International Application No. PCT/EP2021/074762 and European Patent Application, Serial No. 20382827.2 are incorporated herein by reference in their entireties as if fully set forth herein.

BACKGROUND OF THE INVENTION

The invention relates to an induction cooking appliance apparatus.

A cooking appliance apparatus having a main filter and a secondary filter is already known from the prior art, wherein the main filter only filters a power unit, and the secondary filter is fixedly connected to a power supply unit. Moreover, a cooking appliance apparatus having a main filter for filtering a power unit and having a secondary filter for filtering a power supply unit is already known from the prior art, wherein in one operating mode of the power unit the power supply unit in addition to the power unit is filtered by the main filter.

BRIEF SUMMARY OF THE INVENTION

The object of the invention is in particular to provide an apparatus of the generic type having improved characteristics with regard to efficiency.

The invention is based on an induction cooking appliance apparatus, in particular an induction cooktop apparatus, having at least one power unit that is provided so as in one operating state to supply at least one induction heating unit with power, having a power supply unit that is provided so as in the operating state to supply energy to at least one further unit, having a main filter unit for filtering the power unit and having a secondary filter unit for filtering the power supply unit.

It is proposed that the main filter unit and the secondary filter unit are designed at least in part as a single piece and share at least one common filter unit for filtering the power supply unit in an inactive mode of the power unit.

It is advantageously possible due to an embodiment of this type to provide a particularly efficient induction cooking appliance apparatus. If the main filter unit and the secondary filter unit in the inactive mode of the power unit share at least one common filter unit for filtering the power supply unit, it is advantageously possible to reduce a required filter power of the secondary filter unit so as to comply with standards in relation to an electromagnetic compatibility. As a consequence, it is advantageously possible to reduce a number of components of the secondary filter unit and to increase cost efficiency. In particular, it is advantageously possible to omit an additional capacitor, which is otherwise required, in the secondary filter unit since this capacitor can be part of the common filter unit whereby moreover advantageously a discharging unit for discharging this capacitor can be omitted and the cost efficiency can be further improved. Moreover, it is advantageously possible to utilize an installation space in a particularly efficient manner and it is consequently possible to achieve a particularly compact construction. Moreover, a structural arrangement can be advantageously improved. Furthermore, energy consumption of the power supply unit can be advantageously reduced in the inactive mode.

An induction cooking appliance apparatus, in particular an induction oven apparatus, is to be understood to mean at least a part, in particular a subassembly, of an induction cooking appliance. An induction cooking appliance that has the induction cooking appliance apparatus could be designed for example as an induction oven or as an induction grill. In particular, the induction cooking appliance apparatus could be an induction oven apparatus or an induction grill apparatus. It is preferred that an induction cooking appliance that has the induction cooking appliance apparatus is designed as an induction cooktop. It is preferred that the induction cooking appliance apparatus is an induction cooktop apparatus.

It is preferred that the induction cooking appliance apparatus has the at least one induction heating unit. Alternatively, it is conceivable that the induction heating unit is part of the induction cooking appliance that has the induction cooking appliance apparatus. It is preferred that the induction heating unit is provided so as in at least one operating state to supply energy to at least one item of cookware and/or to a cooking compartment by means of an electromagnetic alternating field for the purpose of heating.

It is preferred that in the operating state the power unit performs a frequency conversion and converts in particular a low-frequency alternating current voltage on the input side into a high-frequency alternating current voltage on the output side. It is preferred that the low-frequency alternating current voltage has a frequency of at most 100 Hz. It is preferred that the high-frequency alternating current voltage has a frequency of at least 1000 Hz. It is preferred that the power unit is provided so as to set the electrical power of the induction heating unit at least by setting the high-frequency alternating current voltage. It is preferred that the power unit comprises at least one rectifier. It is preferred that the power unit has at least one heating frequency element that is designed in particular as an inverter. It is preferred that for an operation of the induction heating unit the heating frequency element generates an oscillating electrical current, preferably having a frequency of at least 15 kHz, in particular of at least 17 kHz and advantageously of at least 20 kHz. It is preferred that the inverter comprises at least two bipolar transistors having an insulated gate electrode and particularly advantageously at least one damping capacitor.

It is preferred that the power supply unit is designed as an electrical and/or electronic unit that is provided so as to supply with electrical energy at least one further unit that requires in particular a different voltage than the voltage that is provided by a power supply network. It is preferred that in the operating state and/or in the inactive mode the power supply unit provides at least a direct current voltage to at least one output of the power supply unit. It is preferred that the power supply unit has at least two, in particular at least three and advantageously more outputs at which it is possible to tap in particular different electrical voltages, preferably direct current voltages. It is preferred that the power supply unit is provided so as to supply energy to at least one control unit and/or at least one driver unit of the power unit and/or an operator interface and/or at least one measuring unit, in particular a temperature and/or voltage and/or current measuring unit, and/or at least one cooling fan.

It is preferred that the control unit is designed as an electronic unit that comprises a computing unit and in particular in addition to the computing unit a storage unit having a control program that is stored therein. It is preferred that the control unit is at least provided so as to control and/or regulate at least the power unit with the aid of control signals.

It is preferred that the control unit in the operating state controls the power unit, in particular the inverter of the power unit. It is preferred that the power unit and/or the power supply unit in the operating state is connected to the power supply network. An inactive mode is preferably to be understood to mean a mode in which an electrical supply to the power unit, in particular an electrical connection between the power supply network and the power unit, is interrupted. It is preferred that in the inactive mode at least the power supply unit and particularly preferably only the power supply unit is electrically connected to the power supply network. In the inactive mode, in particular an electrical connection between the power supply network and the power unit is disconnected and/or interrupted.

It is preferred that the main filter unit has at least one filter element that in at least one operating mode assumes at least a filter function, preferably a lowpass filter function so as to minimize high-frequency noise. It is preferred that the main filter unit has at least one fuse that opens a circuit in the event of a short-circuit. It is preferred that the main filter unit has at least one capacitor, preferably a capacitor of the class X2, which is provided so as to reduce electromagnetic interference. It is preferred that the main filter unit has at least one discharging unit that discharges the X2 capacitor in the inactive mode. The main filter unit preferably assumes an overvoltage protection function and namely in particular by means of at least one varistor of the main filter. The main filter comprises in particular at least one restrictor, in particular a current compensating restrictor, and/or at least one capacitor and/or at least one varistor, in particular at least the varistor. In particular, the main filter is provided so as to filter the power unit and/or power supply unit. It is preferred that the main filter unit filters the power unit and the power supply unit in the operating state out of the inactive mode.

It is preferred that the secondary filter unit has at least one filter element that at least in the inactive mode assumes at least a filter function, in particular so as to reduce electromagnetic interference that can be produced by the power supply network and/or the power supply unit. It is preferred that the secondary filter unit in the inactive mode has an essentially lower power consumption than the main filter in the operating state. For example, the secondary filter in the inactive mode could advantageously have a power consumption of at most 200 mW, advantageously at most 150 mW, particularly advantageously at most 100 mW and preferably at most 50 mW. The main filter unit in the operating state could have for example a power consumption of 5 W to 10 w.

It is preferred that the main filter unit and the secondary filter unit are designed at least in part as a single piece with one another in such a manner that at least one element of the main filter unit and at least one element of the secondary filter unit, at least in the inactive mode, are preferably permanently connected to one another in an electrically conductive manner via at least one connection. It is preferred that the common filter unit comprises at least one filter element, preferably at least one main filter coil, which in at least one operating mode of the power unit, which is different from the inactive mode, is allocated to the main filter unit and which is connected in an electrically conductive manner at least in the inactive mode to the secondary filter unit.

Provided is to be understood to mean specifically designed and/or equipped. The fact that an object is provided for a specific function is to be understood to mean that the object fulfils and/or performs this specific function in at least one application and/or operating state.

Moreover, it is proposed that the induction cooking appliance apparatus has a switching element that is electrically upstream of the main filter unit and is provided so as to switch on and switch off the power unit. It is possible due to an embodiment of this type to advantageously further improve efficiency. If the switching element is electrically upstream of the main filter unit, capacitors of the main filter unit during the inactive mode are advantageously not exposed to transient processes of the power supply network, such as for example transient compensating currents and/or compensating voltages whereby advantageously it is possible to prolong a serviceable life of the capacitors and consequently to provide a particularly durable and reliable induction cooking appliance apparatus. Moreover, an overvoltage protection can be advantageously simplified and/or improved if the switching element is electrically upstream of the main filter unit. The switching element can be designed as a mechanical or as an electromechanical switching element, in particular as a relay. Moreover, the switching element could be designed as a semiconductor switching element, for example as a transistor or the like.

Moreover, it is proposed that the induction cooking appliance apparatus has a first conductor connection that is provided so as to connect to a conductor of a power supply network, wherein the switching element is arranged between the main filter unit and the first conductor connection. Due to an embodiment of this type, a switching arrangement can be advantageously simplified. In particular, it is possible by means of the switching element to advantageously simultaneously switch on or switch off the power unit and to activate or deactivate the part of the main filter unit, which is not part of the common filter unit. It is preferred that the first conductor connection is designed as an external conductor connection and is provided so as to connect to an external conductor of a power supply network.

Furthermore, it is proposed that the induction cooking appliance apparatus has a second conductor connection that is provided so as to connect to a neutral conductor of a power supply network, wherein the common filter unit can be connected via the second conductor connection to the power supply network. Due to an embodiment of this type, it is advantageously rendered possible, using simple technical means, to filter the power supply unit in the inactive mode by way of the common filter unit. In particular, it is advantageously possible to improve an arrangement of the common filter unit. It is preferred that the second conductor connection is designed as a neutral conductor connection and is provided so as to connect to a neutral conductor of a power supply network. Alternatively, the second conductor connection could be designed as a further external conductor connection and could be provided so as to connect to a further external conductor of a power supply network.

Furthermore, it is proposed that an impedance of the secondary filter unit is variable in dependence upon a switch position of the switching element. As a consequence, it is advantageously possible to particularly reliably reduce interference signals.

Furthermore, it is proposed that the secondary filter unit in the case of the closed switch position of the switching element has a greater impedance, in particular a greater input impedance and/or output impedance, than the main filter unit. It is possible due to an embodiment of this type to advantageously particularly reliably reduce interference signals. If the secondary filter unit in the case of a closed switch position of the switching element has a greater impedance than the main filter unit, it is possible using simple technical means to effectively prevent a bridging of the main filter unit and a penetration of high-frequency interference signals via the secondary filter unit into the power supply network. Due to capacitive and/or inductive filter elements of the main filter unit, the impedance of the main filter unit changes with the frequency of a signal that is prevailing at the main filter unit. It is preferred that for low-frequency signals, in particular for low-frequency alternating current voltages and/or alternating currents, which are provided by a power supply network usually at a frequency of 50 Hz or 60 Hz, the main filter unit has a lower impedance and for high-frequency signals, in particular for high-frequency interference signals having a frequency of at least 9 kHz, the main filter unit has an increased impedance with the result that an introduction of high-frequency interference signals into the power supply network is prevented. It is preferred that, due to a suitable selection of the electrical and/or electromagnetic characteristics, such as in particular electrical resistances and/or capacitances and/or inductances of filter elements of the main filter unit and/or of the secondary filter unit, both for low-frequency signals as well as for high-frequency signals, preferably for all the high-frequency interference signals, which can occur in the operating state of the power unit, the secondary filter unit has a greater impedance, in particular a greater input impedance and/or output impedance than the main filter unit.

Moreover, it is proposed that the secondary filter unit has a non-linear electronic component that is provided so as in the inactive mode to render possible a connection of the power supply unit to a power supply network via the secondary filter unit. It is advantageously possible due to an embodiment of this type to achieve an energy supply of the power supply unit in the inactive mode using simple technical means. It is preferred that the non-linear electronic component is connected in an electrically conductive manner to the external conductor connection and is provided so as in the inactive mode to render possible a connection of the power supply unit to an external conductor of the power supply network. It is preferred that the non-linear electronic component has a forward voltage characteristic curve or a forward current characteristic curve that is provided in such a manner that a forward voltage or a forward current is exceeded by a voltage, which in the inactive mode drops across the non-linear electronic component, or by a current, which prevails in the inactive mode at the non-linear electronic component, so that a current flow is rendered possible from the external conductor connection via the non-linear electronic component to the power supply unit. It is preferred that the forward voltage characteristic curve or the forward current characteristic curve of the non-linear electronic component is selected so that a current flow via the secondary filter unit in the operating state of the power unit is prevented and in particular an opening of the non-linear component on account of short-term voltage peaks and/or current peaks, which can be produced in particular on account of high-frequency interference signals, is prevented. As a consequence, a bridging of the main filter unit and a penetration of interference signals into the power supply network via the secondary filter unit can be advantageously prevented. It is conceivable that the secondary filter unit has at least one further non-linear electronic component, which cooperates with the non-linear electronic component in order to render possible the connection of the power supply unit to the power supply network via the secondary filter unit.

Moreover, it is proposed that the non-linear electronic component is designed as a suppressor diode. Due to an embodiment of this type, in the inactive mode the connection of the power supply unit to the power supply network can be advantageously rendered possible in a particularly rapid and/or reliable manner via the secondary filter unit. Moreover, a bridging of the main filter unit by interference signals via the secondary filter unit can advantageously be achieved using particularly simple technical means both for interference signals that are triggered on the device side, in other words interference signals that are produced by the power unit and/or the power supply unit, as well as for interference signals that are triggered on the network side if the non-linear electronic component is designed as a suppressor diode. Alternatively or in addition, the non-linear electronic component could be designed as a voltage-controlled TRIAC and/or as a current-controlled TRIAC. Moreover, it is alternatively conceivable that the non-linear component is designed as a DIAC and/or as a varistor and/or as a Zener diode and/or as a voltage terminal and/or as another non-linear electronic component that appears expedient to a person skilled in the art.

Furthermore, it is proposed that the secondary filter unit has at least one filter coil. Due to an embodiment of this type, it can be advantageously rendered possible using particularly simple technical means to filter the power supply unit in the inactive mode. The secondary filter unit could have a plurality of filter coils that are connected to one another in parallel and/or in series. It is preferred that the secondary filter unit has precisely one filter coil. As a consequence, it can be advantageously rendered possible to filter the power supply unit in a particularly cost-effective manner.

Furthermore, it is proposed that the secondary filter unit has an electrical resistor that is arranged in series with the filter coil and is provided so as to limit an inrush current. Due to an embodiment of this type, it is advantageously possible to achieve an effective protection against damage to the filter coil on account of inrush currents that are too high. Moreover, it can be advantageously rendered possible in a particularly cost-effective manner to limit an inrush current. Alternatively or in addition, it would be conceivable that the secondary filter unit has a thermistor (NTC resistor) that is arranged in series with the filter coil and is provided so as to limit an inrush current.

Moreover, it is proposed that the secondary filter unit has a protective element that is arranged parallel to the filter coil and is provided so as to protect the filter coil against overvoltages. Due to an embodiment of this type, it can be advantageously rendered possible to effectively protect the filter coil against overvoltages. Consequently, it is advantageously possible to provide a particularly reliable and durable induction cooking appliance apparatus.

The protective element could, without being limited thereto, be designed as a suppressor diode and/or as a protective diode and/or as a protective capacitor. In one advantageous embodiment, it is however proposed that the protective element is designed as a varistor. As a consequence, it is advantageously possible to ensure a particularly effective overvoltage protection of the filter coil, in particular also in the event of high overvoltages.

The invention further relates to an induction cooking appliance, in particular an induction cooktop, having an induction cooking appliance apparatus according to one of the above-described embodiments. An induction cooking appliance of this type is characterized in particular by the above-mentioned advantageous characteristics of the induction cooking appliance apparatus. It is in particular advantageously possible to provide a particularly cost-effective induction cooking appliance simultaneously having particularly reliable characteristics with regard to an electromagnetic compatibility.

The induction cooking appliance apparatus in this case is not to be limited to the above-described application and embodiment. In particular, the induction cooking appliance apparatus can have a number of individual elements, components and units that deviates from a number mentioned herein in order to fulfil a function that is described herein.

Further advantages are apparent in the following description of the drawing. An exemplary embodiment of the invention is illustrated in the drawing. The drawing, the description and the claims include numerous features in combination. The person skilled in the art will also expediently take the features into consideration individually and will combine the features to expedient further combinations.

DETAILED DESCRIPTION OF EXEMPLARY EMBODIMENTS OF THE PRESENT INVENTION

Figure 1:
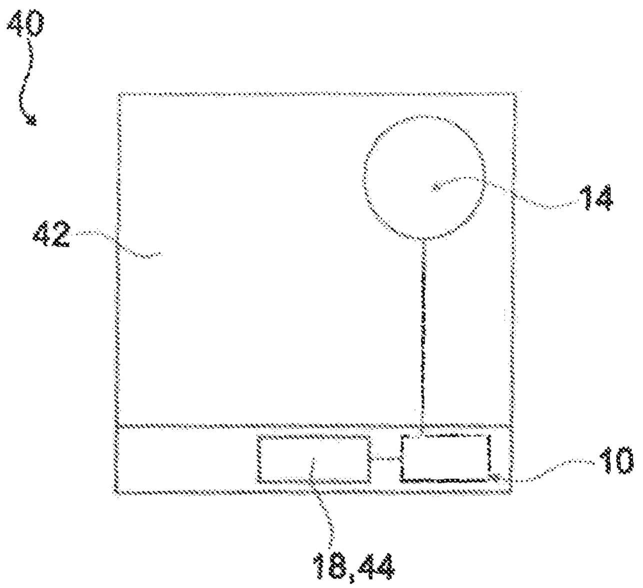
FIG. 1 shows an induction cooking appliance having an induction cooking appliance apparatus in a schematic view.

FIG. 1 illustrates an induction cooking appliance 40. The induction cooking appliance 40 is designed as an induction cooktop. The induction cooking appliance 40 has a placement plate 42. The induction cooking appliance 40 has an induction cooking appliance apparatus 10. The induction cooking appliance apparatus 10 has an induction heating unit 14. The induction heating unit 14 is provided so as to heat at least one item of cookware (not illustrated) that is placed on the placement plate 42 of the induction cooking appliance 40. The induction cooking appliance apparatus 10 has at least one further unit 18. In the present case, the further unit 18 is designed as an operator interface 44.

Figure 2:
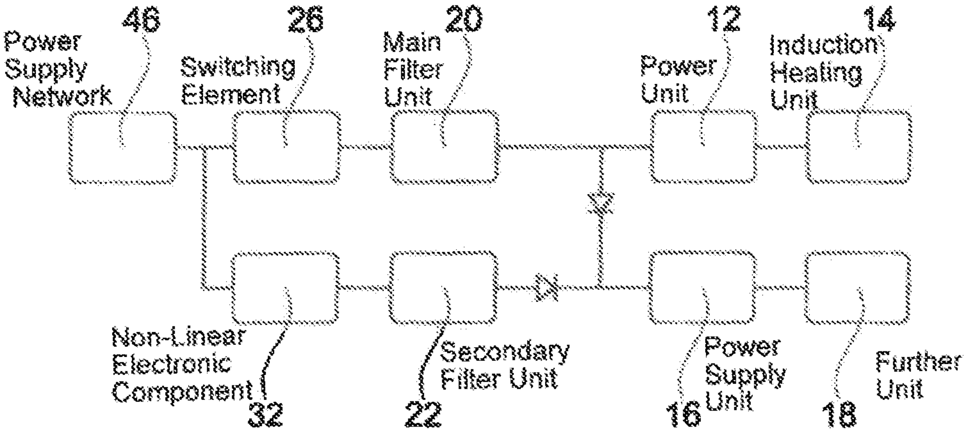
FIG. 2 shows a schematic diagram of the induction cooking appliance apparatus having a power unit, a power supply unit, a main filter unit and a secondary filter unit.

FIG. 2 illustrates a schematic diagram of the induction cooking appliance apparatus 10. The induction cooking appliance apparatus 10 has a power unit 12. In an operating state of the induction cooking appliance apparatus 10, the power unit 12 is provided so as to supply at least the induction heating unit 14 with power. In the present case, the power unit 12 has at least one inverter (not illustrated) that in one operating state of the power unit 12 converts a low-frequency alternating current voltage that is provided by a power supply network 46 into a high-frequency alternating current voltage.

The induction cooking appliance apparatus 10 has a power supply unit 16. The power supply unit 16 is provided so as to supply energy to at least the further unit 18.

The induction cooking appliance apparatus 10 has a main filter unit 20. The main filter unit 20 is provided so as in the operating state to filter the power unit 12. In the present case, the main filter unit 20 in the operating state filters the power unit 12 and the power supply unit 16.

The induction cooking appliance apparatus 10 has a secondary filter unit 22. The secondary filter unit 22 is provided so as to filter the power supply unit 16 at least in an inactive mode of the power unit 12.

The induction cooking appliance apparatus 10 has a switching element 26. The switching element 26 is electrically upstream of the main filter unit 20. The switching element 26 is provided so as to switch on and switch off the power unit 12.

Figure 3:
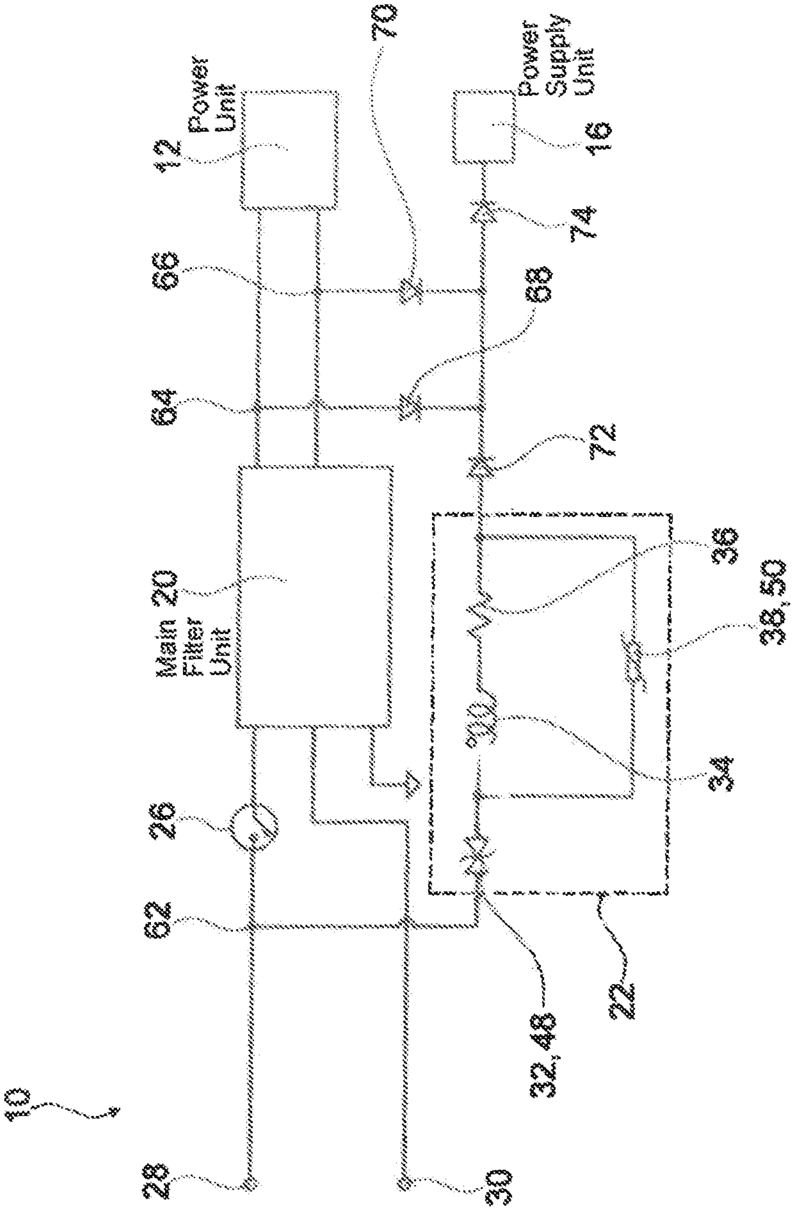
FIG. 3 shows a schematic electrical circuit diagram of the induction cooking appliance apparatus.

FIG. 3 illustrates a schematic electrical circuit diagram of the induction cooking appliance apparatus 10. The induction cooking appliance apparatus 10 has a first conductor connection 28. The first conductor connection 28 is provided so as to connect to a conductor (not illustrated) of the power supply network 46 (cf. FIG. 2). In the present case, the first conductor connection 28 is designed as an external conductor connection and is provided so as to connect to an external conductor (not illustrated) of the power supply network 46.

The switching element 26 is arranged between the main filter unit 20 and the first conductor connection 28.

The induction cooking appliance apparatus 10 has a second conductor connection 30. The second conductor connection 30 is provided so as to connect to a further conductor (not illustrated) of the power supply network 46. In the present case, the second conductor connection 30 is designed as a neutral conductor connection and is provided so as to connect to a neutral conductor (not illustrated) of the power supply network 46. Alternatively, the second conductor connection 30 could however also be designed as a further external conductor connection and could be provided so as to connect to a further external conductor (not illustrated) of the power supply network 46.

Figure 4:
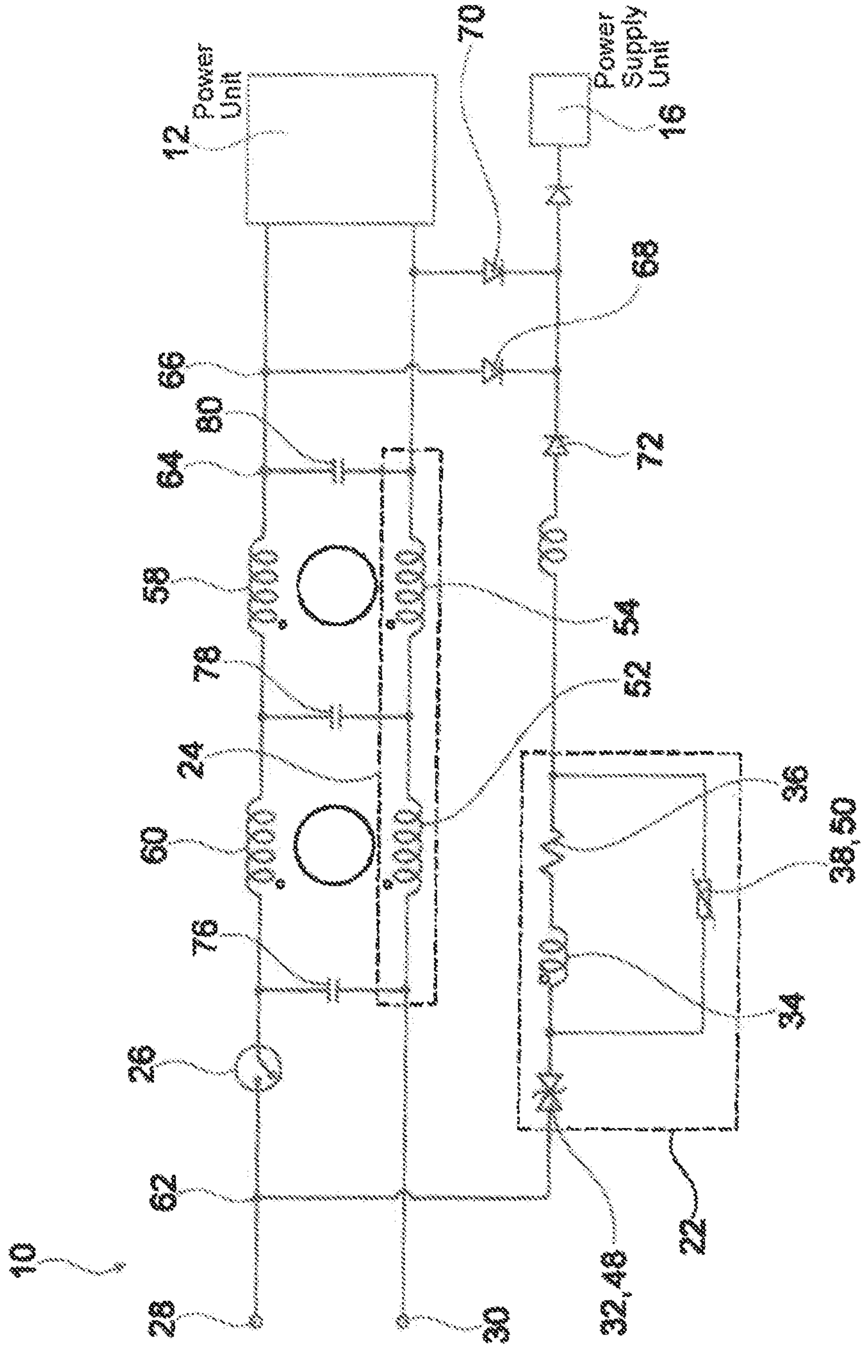
FIG. 4 shows a schematic electrical circuit diagram of the induction cooking appliance apparatus in an inactive mode of the power unit and FIG. 5 shows a schematic electrical circuit diagram of the induction cooking appliance apparatus in an operating state of the power unit.

FIG. 4 illustrates a schematic electrical circuit diagram so as to illustrate the induction cooking appliance apparatus 10 in the inactive mode of the power unit 12. In the inactive mode of the power unit 12, the switching element 26 is open. The main filter unit 20 and the secondary filter unit 22 are designed at least in part as a single piece. In the inactive mode of the power unit 12, the main filter unit 20 and the secondary filter unit 22 share at least a common filter unit 24. The common filter unit 24 comprises a main filter coil 52 and a further main filter coil 54. The common filter unit 24 can be connected via the second conductor connection 30 to the power supply network 46 (cf. FIG. 2).

The secondary filter unit 22 has a non-linear electronic component 32. The non-linear electronic component 32 is provided so as in the inactive mode to render possible a connection of the power supply unit 16 to the power supply network 46 via the secondary filter unit 22.

In the present case, the non-linear electronic component 32 is designed as a suppressor diode 48.

In the inactive mode, the power supply unit 16 can be connected via the common filter unit 24 by means of the second conductor connection 30 to the further conductor (not illustrated) of the power supply network 46. In the inactive mode, the power supply unit 16 can be connected via the secondary filter unit 22 by means of the first conductor connection 28 to the conductor (not illustrated) of the power supply network 46. The secondary filter unit 16 is connected via a connection point 62 to the first conductor connection 28. The connection point 62 is electrically upstream of the switching element 26. If the power supply unit 16 in the case of the open switching element 26 is connected to the power supply network 46, a voltage drops at the non-linear electronic component 32, which is designed as a suppressor diode 48, and the voltage exceeds a forward voltage of the suppressor diode 48 so that this suppressor diode conducts and a current flow is rendered possible from the first conductor connection 28 to the power supply unit 16.

The secondary filter unit 22 of the induction cooking appliance apparatus 10 has a filter coil 34. The filter coil 34 is provided so as to filter the power supply unit 16 in the inactive mode.

The secondary filter unit 22 has an electrical resistor 36. The electrical resistor 36 is arranged in series with the filter coil 34. The electrical resistor 36 is provided so as to limit an inrush current so as to protect the filter coil 34 against damage on account of inrush currents that are too high.

The secondary filter unit 22 has a protective element 38. The protective element is arranged parallel to the filter coil 34. The protective element 38 is provided so as to protect the filter coil 34 against overvoltages. In the present case, the protective element 38 is designed as a varistor 50. The protective element 38 that is designed as a varistor 50 renders it possible to also protect the filter unit in the event of high overvoltages.

Figure 5:
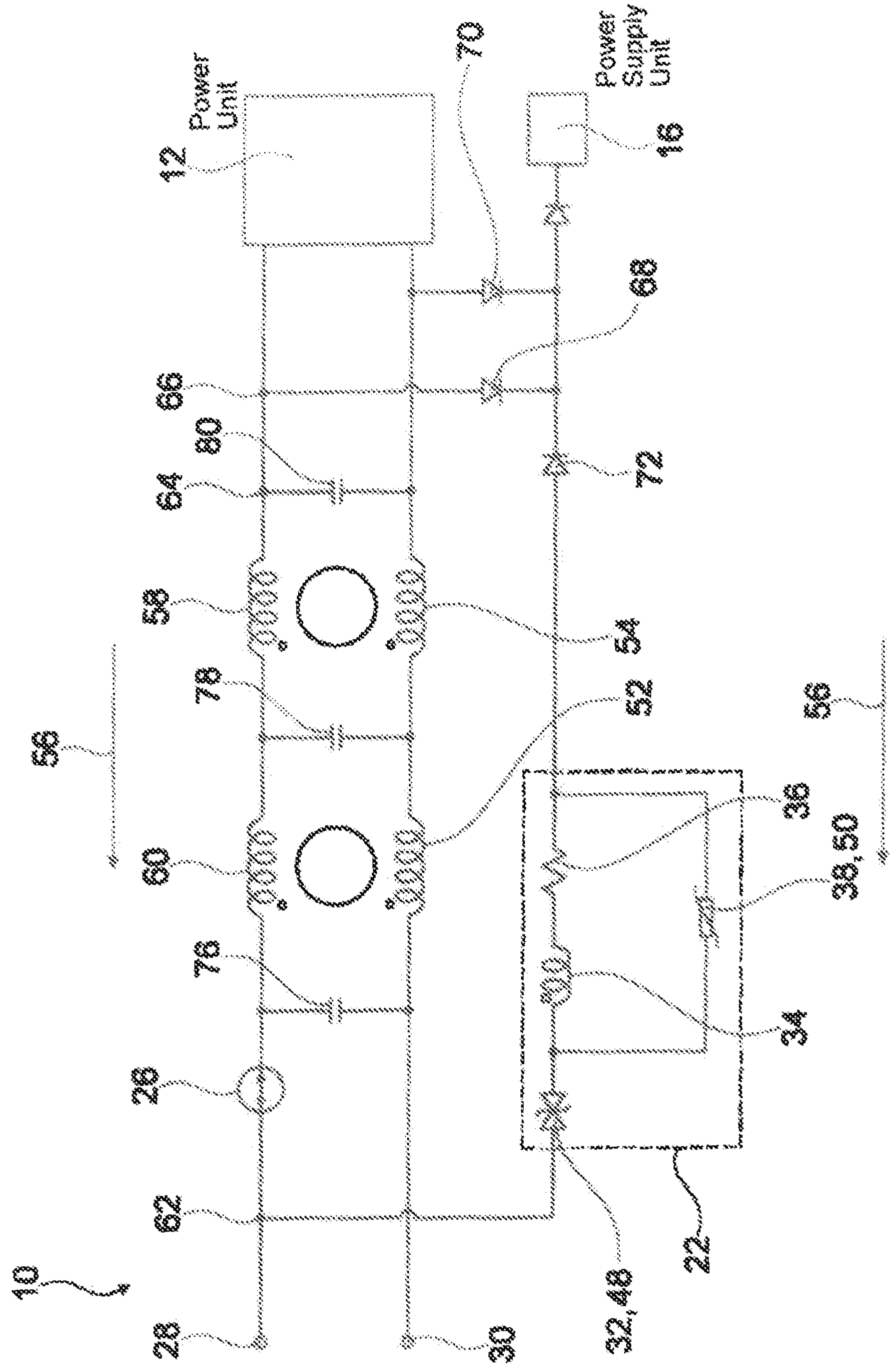

FIG. 5 illustrates a schematic electrical circuit diagram of the induction cooking appliance apparatus 10 so as to illustrate the operating state of the power unit 12. In the operating state, the switching element 26 is closed and the power unit 12 is connected via the main filter unit 20 by means of the first conductor connection 28 and the second conductor connection 30 to the power supply network 46. In the operating state of the power unit 12, the power supply unit 16 is connected via the main filter unit 20 by means of the first conductor connection 28 and the second conductor connection 30 to the power supply network 46. The power supply unit 16 is connected to the first conductor connection 28 via a further connection point 64 that is electrically downstream of the main filter unit 20.

In the operating state, a current flow is rendered possible from the first conductor connection 28 to the power supply unit via a diode 68 and a further diode 74. The power supply unit 16 is connected to the second conductor connection 30 via a further connection point 66 that is electrically downstream of the main filter unit 20. In the operating state, a current flow is rendered possible from the second conductor connection 30 to the power supply unit 16 via a further diode 70. A further diode 72 in the operating state prevents a current flow in the direction of the secondary filter unit 22. Consequently, the power supply unit 16 is filtered in the operating state of the power unit 12 via the main filter 20. The main filter unit 20 in order to filter the power unit 12 and the power supply unit 16 in the operating state has the main filter coil 52 and the further main filter coil 54 and also two further main filter coils 58, 60. In order to filter the power unit 12 and the power supply unit 16 in the operating state, the main filter unit 20 has an X2 capacitor 76 and two further X2 capacitors 78, 80. The main filter unit 20 provides a clearly increased filter power with respect to the secondary filter unit 22.

The secondary filter unit 22 has an impedance that is variable in dependence upon a switch position of the switching element 26. In the case of a closed switch position of the switching element 26, the secondary filter unit 22 has a greater impedance, in particular a greater input impedance and/or output impedance, than the main filter unit 20. The impedance of the main filter unit 20 is frequency-dependent. For signals having a low frequency, in particular for signals of the power supply unit 46 having a network frequency of typically 50 Hz or 60 Hz, the main filter unit represents a smaller impedance. Therefore a voltage, which in the operating state of the power unit 12 drops across the non-linear component 32, is lower than the forward voltage of the non-linear component and a current flow from the external conductor connection 28 via the secondary filter unit 22 to the power supply unit 16 is blocked. For high-frequency interference signals 56, which can be produced in particular by the power unit 12 and which have a frequency of at least 9 kHz, the main filter unit 20 has an increased impedance. The impedance of the secondary filter unit 16 is designed so that this secondary filter unit also has a greater impedance for high-frequency interference signals 56 than the main filter unit 20 so that these high-frequency interference signals are filtered in the operating state of the power unit 12 by the main filter unit 20 and a short-circuit of the main filter unit 20 via the secondary filter unit 22 is prevented.

The invention claimed is:

1. An induction cooking appliance apparatus, comprising:

a power unit configured to supply an induction heating unit with power in an operating state;

a power supply unit configured to supply energy to a further unit in the operating state;

a main filter unit configured to filter the power unit; and a secondary filter unit configured to filter the power supply unit, wherein the main filter unit and the secondary filter unit are configured at least in part as a single piece and share a common filter unit for filtering the power supply unit in an inactive mode of the power unit, wherein the power supply unit provides at least one DC voltage to at least one output of the power supply unit during the operating state and/or during an inactive mode of the power unit, wherein at least one element of the main filter unit and at least one element of the secondary filter unit are electrically conductively connected to one another via at least one connection at least during said inactive mode, and wherein the main filter unit and the secondary filter unit share at least one common filter unit for filtering the power supply unit during said inactive mode of the power unit.

2. The induction cooking appliance apparatus of claim 1, constructed in a form of an induction cooktop apparatus.

3. The induction cooking appliance apparatus of claim 1, further comprising a switching element positioned electrically upstream of the main filter unit and configured to switch on and switch off the power unit.

4. The induction cooking appliance apparatus of claim 3, further comprising a conductor connection configured for connection to a conductor of a power supply network, said switching element being arranged between the main filter unit and the conductor connection.

5. The induction cooking appliance apparatus of claim 3, further comprising a conductor connection configured for connection to a conductor of a power supply network, said common filter unit connectable via the conductor connection to the power supply network.

6. The induction cooking appliance apparatus of claim 3, wherein the secondary filter unit has an impedance which is variable in dependence upon a switch position of the switching element.

7. The induction cooking appliance apparatus of claim 3, wherein the secondary filter unit has an impedance which in a closed switch position of the switching element is greater than an impedance of the main filter unit.

8. The induction cooking appliance apparatus of claim 7, wherein the impedance is an input impedance or an output impedance.

9. The induction cooking appliance apparatus of claim 1, wherein the secondary filter unit includes a non-linear electronic component configured to enable in the inactive mode of the power unit a connection of the power supply unit to a power supply network via the secondary filter unit.

10. The induction cooking appliance apparatus of claim 9, wherein the non linear electronic component is configured as a suppressor diode.

11. The induction cooking appliance apparatus of claim 1, wherein the secondary filter unit includes a filter coil.

12. The induction cooking appliance apparatus of claim 11, wherein the secondary filter unit includes an electrical resistor arranged in series with the filter coil and configured to limit an inrush current.

13. The induction cooking appliance apparatus of claim 11, wherein the secondary filter unit includes a protective element arranged parallel to the filter coil and designed to protect the filter coil against overvoltage.

14. The induction cooking appliance apparatus of claim 13, wherein the protective element is configured as a varistor.

15. An induction cooking appliance, comprising an induction cooking appliance apparatus, said induction cooking appliance apparatus comprising:

a power unit configured to supply an induction heating unit with power in an operating state;

a power supply unit configured to supply energy to a further unit in the operating state, a main filter unit configured to filter the power unit; and a secondary filter unit configured to filter the power supply unit, wherein the main filter unit and the secondary filter unit are configured at least in part as a single piece and share a common filter unit for filtering the power supply unit in an inactive mode of the power unit, wherein the power supply unit provides at least one DC voltage to at least one output of the power supply unit during the operating state and/or during an inactive mode of the power unit, wherein at least one element of the main filter unit and at least one element of the secondary filter unit are electrically conductively connected to one another via at least one connection at least during the inactive mode, and wherein the main filter unit and the secondary filter unit share at least one common filter unit for filtering the power supply unit during said inactive mode of the power unit.

16. The induction cooking appliance of claim 15, constructed in a form of an induction cooktop.

* * * * *